Feb. 25, 1964  F. L. HARRIS  3,121,987
BRUSH AND TREE CLEARING, DISINTEGRATING AND MASTICATING MACHINE
Filed June 16, 1960  5 Sheets-Sheet 1
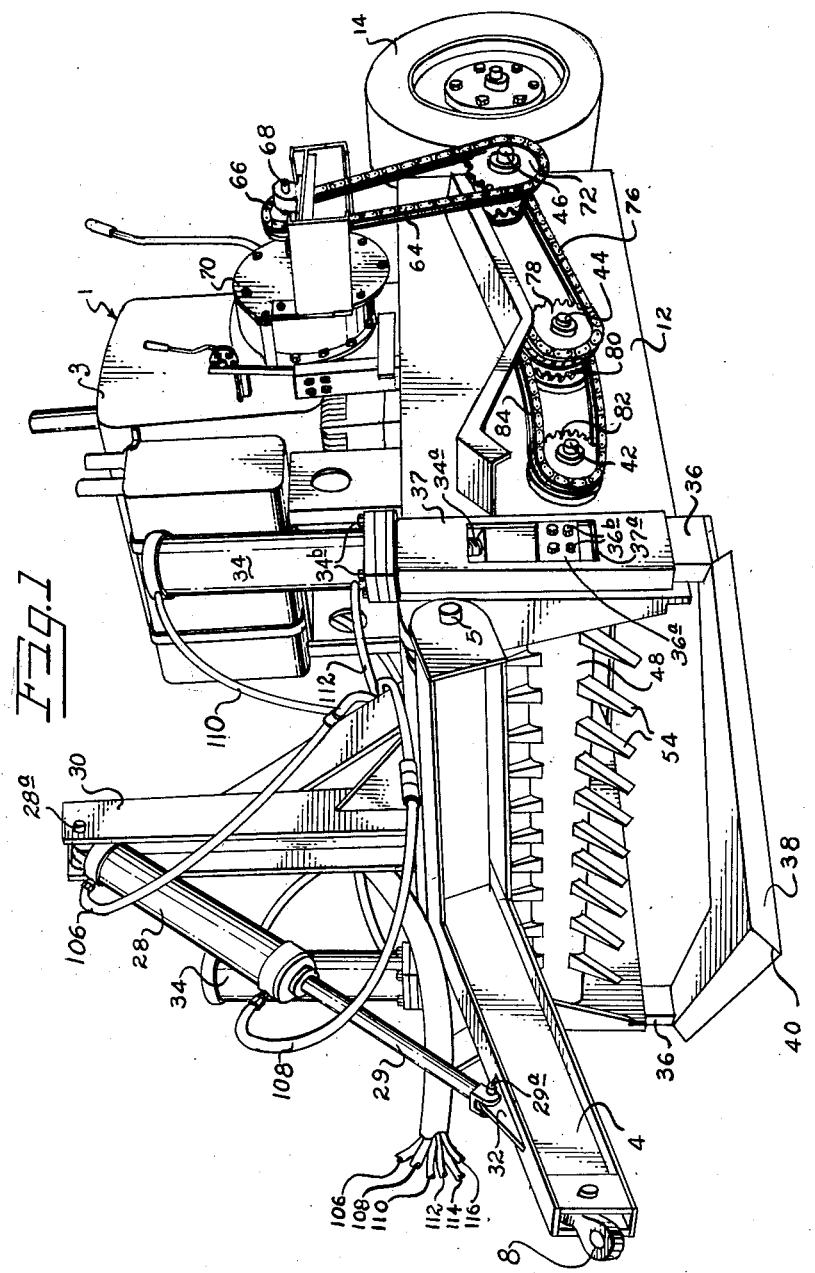
INVENTOR.
*FITZHUGH LEE HARRIS*
BY
*Wayland D. Keith*
HIS AGENT Feb. 25, 1964  F. L. HARRIS  3,121,987
BRUSH AND TREE CLEARING, DISINTEGRATING AND MASTICATING MACHINE
Filed June 16, 1960  5 Sheets-Sheet 2
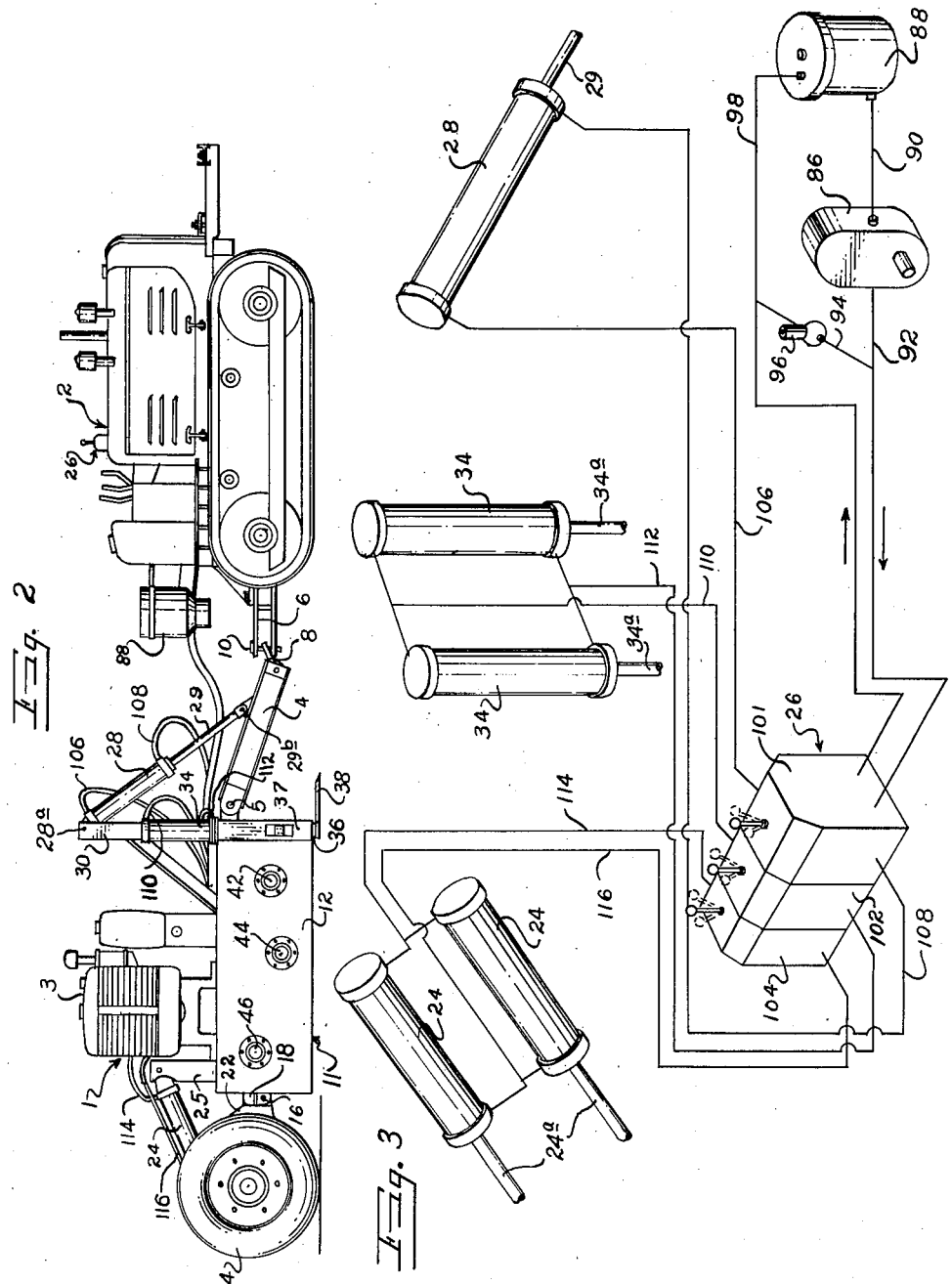
INVENTOR.
FITZHUGH LEE HARRIS
BY
Wayland D. Keith
HIS AGENT Feb. 25, 1964        F. L. HARRIS        3,121,987
BRUSH AND TREE CLEARING, DISINTEGRATING AND MASTICATING MACHINE
Filed June 16, 1960        5 Sheets—Sheet 3
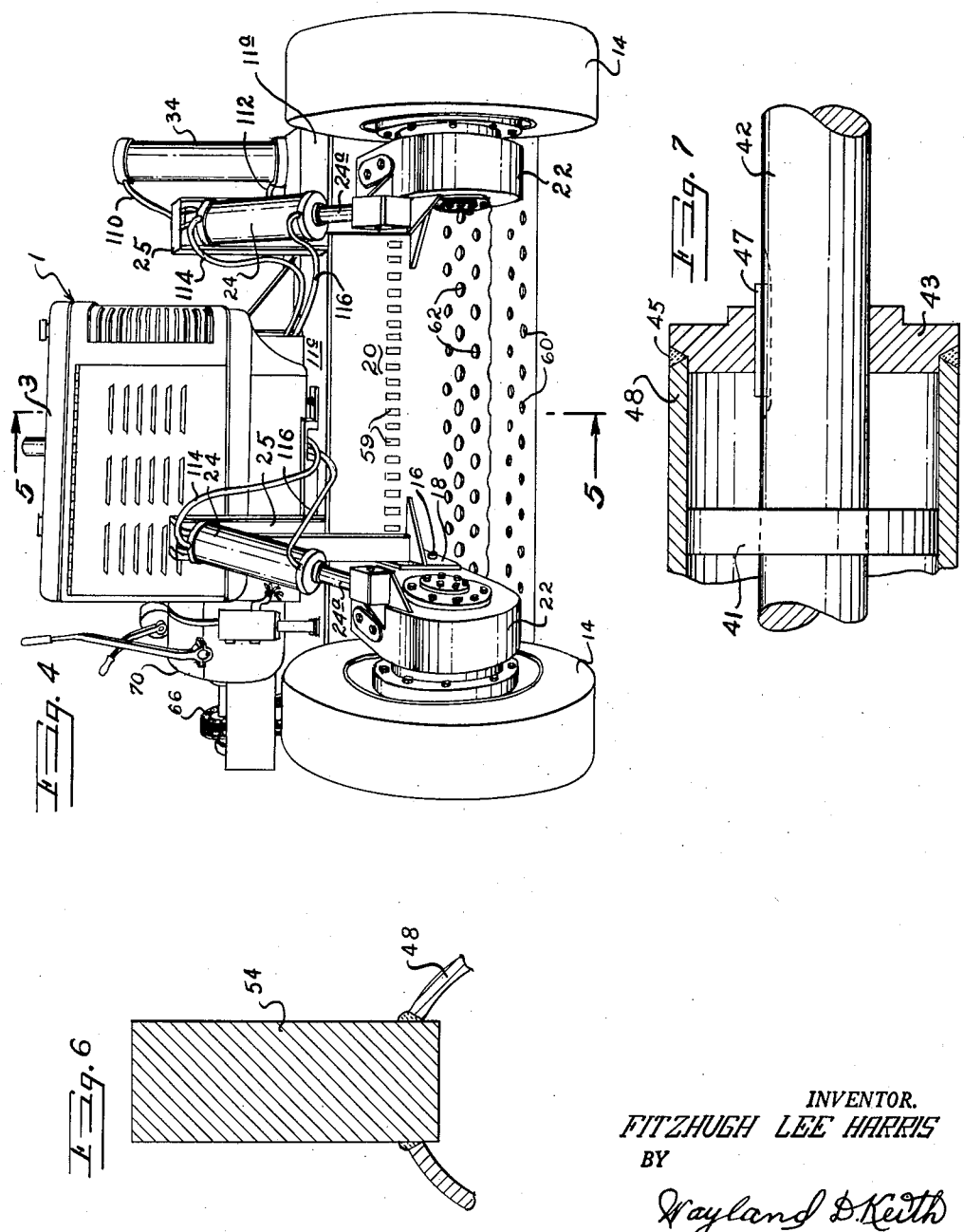
INVENTOR.
FITZHUGH LEE HARRIS
BY
Wayland D. Keith
HIS AGENT

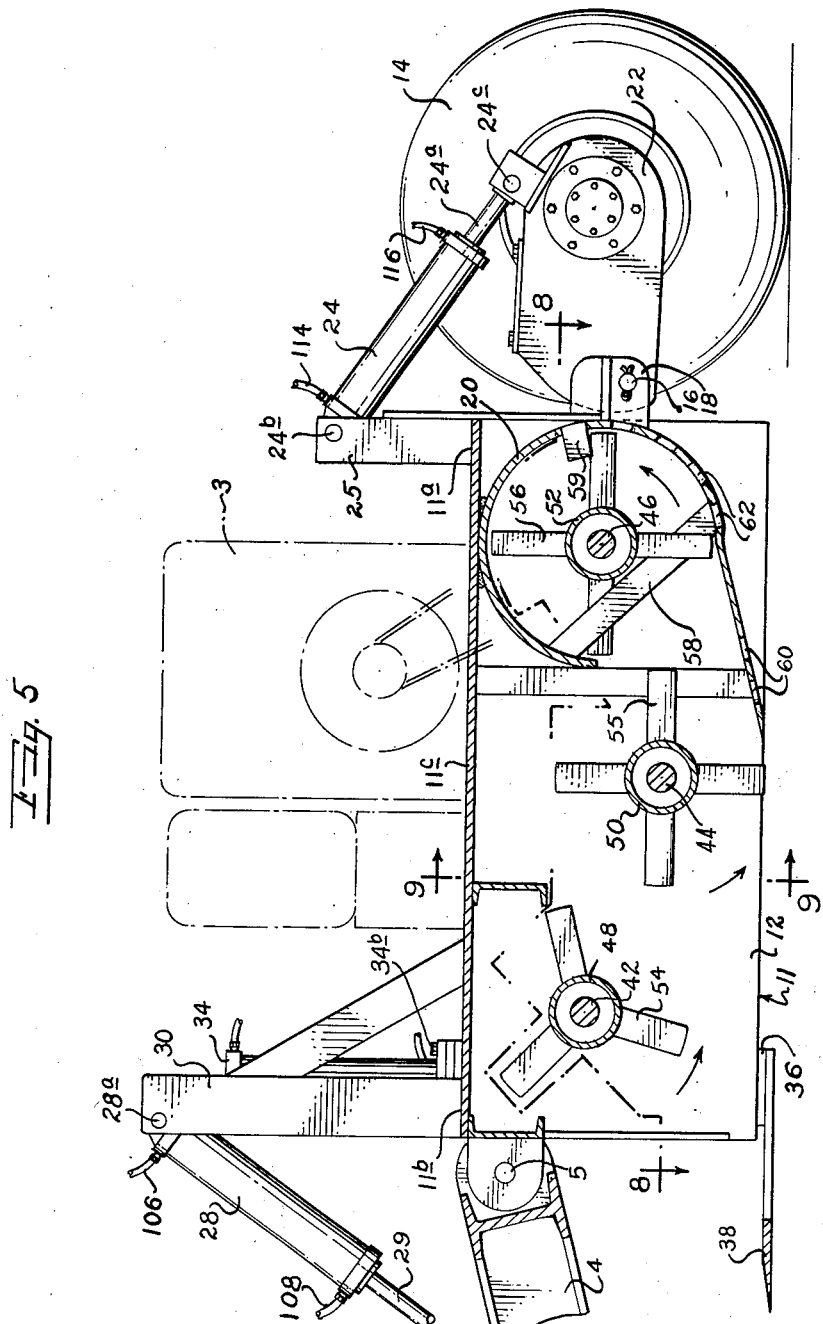

Feb. 25, 1964　　　F. L. HARRIS　　　3,121,987
BRUSH AND TREE CLEARING, DISINTEGRATING AND MASTICATING MACHINE
Filed June 16, 1960　　　　　　　　　　　　5 Sheets-Sheet 5
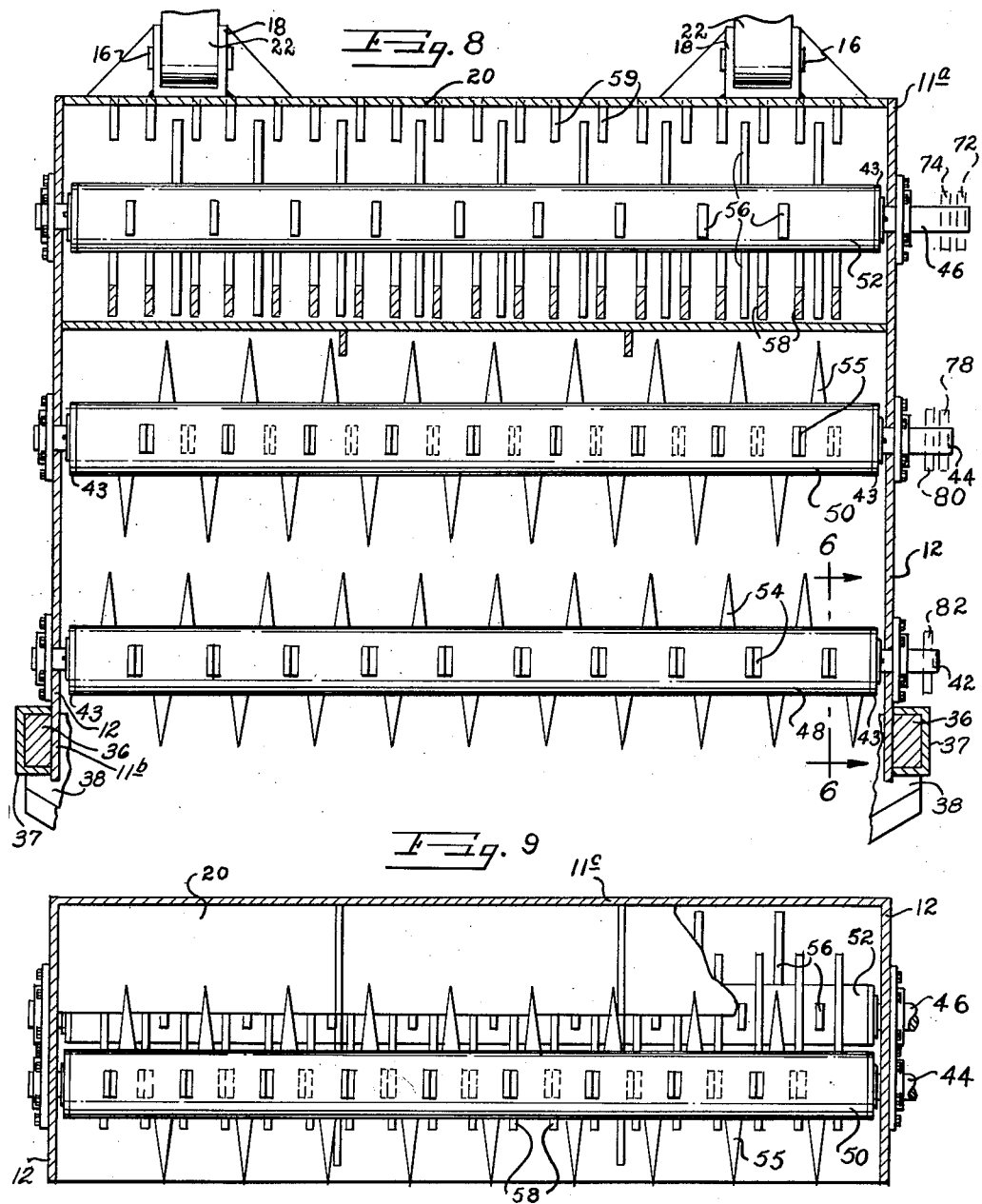
INVENTOR.
FITZHUGH LEE HARRIS
BY
Wayland D. Keith
HIS AGENT United States Patent Office 3,121,987
Patented Feb. 25, 1964

1

3,121,987
BRUSH AND TREE CLEARING, DISINTEGRATING
AND MASTICATING MACHINE
Fitzhugh Lee Harris, Abilene, Tex.
(Box 108, Nacogdoches, Tex.)
Filed June 16, 1960, Ser. No. 36,676
5 Claims. (Cl. 56—504)

This invention relates to improvements in brush, tree, and vegetation disintegrating and masticating machines.

Various devices have been proposed heretofore for cutting stalks of plants, as by stalk cutters and the like, and for cutting such vegetation into small particles so that it can be plowed back into the ground, or other disposition made thereof, but such devices applied particularly to small vegetation.

The present device is particularly adapted to clearing land of brush, some trees, cacti and the like by cutting same, which growth is then masticated or disintegrated so that the resultant mass may be utilized for whatever purpose it may be applicable, such as fertilizing the soil from which it has been removed, or it may be admixed with other ingredients, such as molasses to produce a feed suitable for stock.

An object of this invention is to provide a device which will simultaneously cut shrubs, undergrowth, cacti, trees and the like from the surface of the ground to render such surface free of vegetation, and then to disintegrate or masticate such vegetation so that it can be easily handled for feed, fertilizer or the like.

Another object of the invention is to provide a device which may be driven over the terrain at a relatively fast pace, to enable the ground to be simultaneously cleared of vegetation and conditioned for planting or the like.

Still another object of the invention is to provide a machine which may be operated at a low cost to enable land to be cleaned in a minimum of time and at minimum cost.

A still further object of the invention is to provide a machine for disintegrating or masticating brush, trees and the like, which machine may be effectively operated by a single operator to clear and land of vegetation.

With these objects in mind and others which will become manifest as the description proceeds, reference is to be had to the accompanying drawings in which like reference characters designate like parts in the several views thereof, in which:

FIG. 1 is a perspective view, taken substantially from the front and a side of the device, and showing the power drive unit and the transmission chains connected therewith, and showing one of the various rotatable toothed drums, the device being shown detached from the traction elements:

FIG. 2 is a side elevational view of the device as attached to a traction element, and showing the opposite side of the machine from that shown in FIG. 1;

FIG. 3 is a diagrammatic view of the hydraulic system provided to operate the various mechanisms of the machine, and showing the valve actuating levers in full and in dashed outline;

FIG. 4 is an enlarged perspective view of the machine, taken from the rear thereof;

FIG. 5 is an enlarged longitudinal, sectional view taken through the machine on the line 5—5 of FIG. 4, looking in the direction indicated by the arrows, and showing the

2 various disintegrating, toothed members, and showing the various hydraulic cylinders attached thereto, with the power drive mechanism being shown in dot-dash outline;

FIG. 6 is an enlarged, fragmentary, sectional view taken on the line 6—6 of FIG. 8, looking in the direction indicated by the arrows of one of the bladed, cylindrical disintegrater members, and showing a section through one of the blades thereof;

FIG. 7 is an enlarged fragmentary, sectional view of an end portion of one of the bladed, cylindrical distintegrater members, and showing the manner of mounting the shaft therein;

FIG. 8 is a sectional view taken on the line 8—8 of RIG. 5, looking in the direction indicated by the arrows;

FIG. 9 is a sectional view taken substantially on the line 9—9 of FIG. 5, looking in the direction indicated by the arrows, with parts being broken away and with parts being shown in section to bring out the details of construction.

With more detailed reference to the drawing, the numeral 1 designates generally the machine for disintegrating and masticating brush, trees and the like, which machine has tongue 4 pivotally connected to the forward end of the frame 11 by pivot pins 5, the other end of the tongue being connected to the draw bar 6 of a tractor 2 by means of a swivel connection 8 and pin 10. The tree and brush disintegrating machine has a frame designated generally at 11, which frame has heavy side plates 12 and a cover plate 11c secured thereto along the upper edges thereof. Support members 22 are pivotally secured to the respective lugs 18, by means of the respective pins 16, which lugs 18 are secured to the rear portion of a perforate arcuate metal plate, or parti-cylindrical member 20 which extends between side plates 12 at the rear thereof which side plates 12, cover plate 11c and perforate arcuate plate 20 form a substantially closed housing, with an open lower side and an open front, with the perforate rear plate to form a discharge outlet for comminuted material therethrough. Wheels 14 are mounted on support members 22 for relative turning movement with respect thereto. Hydraulic cylinders 24 are pivotally connected by pins 24b to upright support members 25 at the rear end 11a of the frame 11 and the connecting rods 24a of the respective hydraulic cylinders 24 are pivotally connected by pins 24c to the respective support members 22 to enable the wheels 14 to be moved about the axis of pins 16. In this manner the rear portion of the frame 11 may be raised or lowered with respect to the ground level, upon actuation of the hydraulic cylinders 24, by manipulation of the lever of one of the hydraulic valves, which valves are designated generally at 26, or by lowering the frame 11 until the side plate 12 engage the ground, whereby the wheels 14 will be raised clear of the ground. The cylinders 24 operate to raise or lower the rear portion of the frame to the proper height at which the machine is to be operated.

A further hydraulic cylinder 28 is pivotally mounted on pins 28a, at its upper end, to an upright standard 30, which standard 30 is mounted on the forward end 11b of the frame 11. The cylinder 28 has a plunger 29 which is pivotally connected by pins 29a to a lug 32 on tongue 4 so the forward end of the machine 1 may be raised or lowered with respect to the surface of the ground.

A pair of upright cylinders 34 provided, one of which hydraulic cylinders is mounted on each side of the frame 11 near the forward end of the respective side plates 12. A pair of substantially box section guide-ways 37, which are preferably rectangular in shape, are secured to the respective forward ends of side plates 12 so as to be in aligned relation with the connecting rods 34a of the respective hydraulic cylinders 34. Complementary slide bars 36 are mounted within guide-ways 37 and are slidable therein and are attachably connected by screw-threads, at their upper ends, to the screw-threaded connecting rods of the respective hydraulic cylinders to enable the bars to be disconnected therefrom. The box section guide-ways 37 each have one side open at 37a for a portion of the length thereof to enable access to the screw-threaded portion of connecting rods 34a. An abutment block 36a is bolted on each of the slide bars 36, by bolts 36b, which blocks are in complementary sliding relation within the openings 37a. Upon removal of blocks 36a the slide bars 36 may be lowered to enable screw-threaded rods 34a to be disconnected from the slide bars 36 to enable the removal of the slide bars from the guide-ways 37. Bolts 34b attachably connect the cylinders 34 to the upper ends of the guide-ways 37.

A blade 38 extends transversely between and is secured to the lower ends of bars 36. It is preferable to have the transverse blade 38 of slightly V-shape, with the pointed portion 40 thereof extending forwardly. The machine 1 has shafts 42, 44, and 46 positioned transversely thereof and extending through the side plates 12, which shafts are secured within the respective rotatable members or cylinders 48, 50 and 52, as will best be seen in FIGS. 5 and 7.

The cylinder 48 has circumferentially arranged, longitudinally spaced cutter teeth 54 secured thereto, as by welding or the like, so when the cylinder 48 is turned in the direction indicated by the arrow in FIG. 5, vegetation is moved inward toward cylinder 50, after the vegetation has been cut by the blade 38. The machine, as shown in FIG. 10, has the blade 38 removed therefrom and is capable of cutting an average growth of brush, shrubs, trees, cacti and the like, in close proximity to the ground, without the use of the blade 38. If it is desired that the vegetation be severed below the surface of the ground, it is preferable to use the blade 38, which blade is readily detachable from the machine, which may be used with or without this blade, according to the work to be done.

It is preferable to have the cutter teeth 54 of cylinder 48 wedge shaped, with the pointed edge being in aligned relation with the rotation of the cylinder 48. This particular cutting operation will tend to cut or tear most of the vegetation into chunks or shreds, which material is then fed onto cylinder 50 which cylinder has wedge shaped cutter teeth 55, similar to the cutter teeth 54 on cylinder 48, secured thereto and spaced circumferentially therearound and longitudinally therealong. The respective cutter teeth 55 each describe a circle which is substantially tangential with a plane extending between the lower edges of side plates 12.

The cutter teeth 54 on cylinder 48 are arranged on one hundred twenty degree circumferential spacing and are arranged in staggered relation longitudinally of the cylinder so as to form a spiral pattern, which in the present instance, is a right hand spiral, and the cutter teeth 55 on cylinder 50 are arranged on ninety degree spacing and are in staggered relation longitudinally, which cutter teeth are so arranged as to form a spiral, which in the present instance, is a left hand spiral, so as vegetation passes by spiral toothed cylinder 48, it will have a tendency to work toward one side of the side plates 12, whereas, the toothed cylinder 50 will have a tendency to move the vegetation toward the opposite side of plates 12, and since there is a greater number of cutter teeth on the cylinder 50 than on cylinder 48, the material will be comminuted to a greater degree. The material, when disintegrated by cutter teeth 55, will be directed onto cylinder 52, which arrangement of cylinders and teeth will best be seen in FIG. 8, whereupon the particles of vegetation will be further reduced in size.

The cylinder 52 has square faced teeth 56 spaced circumferentially therearound and arranged longitudinally therealong, which circumferentially arranged cutter teeth are in staggered relation, but are so positioned as to pass between upright, stationary bars 58 and teeth 59 which upright, stationary bars 58 and teeth 59 form baffle members within the housing formed by arcuate plate 20 to perform a shearing action on the vegetation passing therethrough. The teeth 56 and stationary bars 58 are so spaced therebetween to cause the particles of vegetation to be comminuted to a finer degree than is cut by the teeth on the cylinder 48 and cylinder 50, so that the particles of vegetation, brush, and wood are reduced to a form so comminuted as to resemble coarse sawdust and small chips, which vegetation is so reduced and masticated as to be in form to pass out through holes 60 and 62 in the lower side of arcuate plate 20.

The respective cylinders 48, 50 and 52 are mounted on the respective shafts 42, 44, and 46. The mounting of the shaft 42 within cylinder 48, as illustrated in FIG. 7, is representative of the mounting of the respective shafts 44 and 46 in the respective cylinders 50 and 52. Annular spacer rings 41 are shown to be positioned on the shaft 42, at spaced intervals throughout the length of the cylinder 48, which annular spacer rings 41 have the bores thereof in close fitting relation with the shaft 42 and the outside diameter thereof in close fitting relation with the inside diameter of the cylinder 48, which will serve to increase the rigidity of the cylinder 48 and the shaft 42.

An end plate 43 is fitted on shaft 42 and is shouldered to fit within cylinder 48 at each end thereof, so that the end plates may be welded, as indicated at 45 to the ends of cylinder 48. The end plates 43 and shaft 42 have complementary keyways therein to receive keys 47. The construction of cylinders 50 and 52 is similar to the construction as set out for the construction of cylinder 48, thereby enabling the use of smaller shafts therein than would be possible if the bracing was not provided intermediate the respective shafts and the respective cylinders.

The cylinders 48, 50 and 52 all rotate in the same direction, as indicated by the arrows in FIG. 5, and they are driven by chain 64, which chain is connected with a sprocket 66 on shaft 68, which shaft extends between side plates 12 and is journaled therein. A transmission 70 is provided so that the chain 64 and the cylinders connected therewith may be driven at different rates of speed, in accordance with the operation being performed. The chain 64 will, in turn, drive sprockets 72 and 74 on shaft 46 to rotate cylinder 52. A chain 76 extends between sprockets 74 and 78, which sprocket 78 is mounted on shaft 44, which shaft is journaled within side plates 12. A further sprocket 80 is mounted on shaft 44 so as to drive sprocket 82 by chain 84, which sprocket 82 is fixedly secured to shaft 42, which shaft extends between and is journaled in side plates 12 so as to rotate drum 48 which is secured thereto. In this manner the drums 48, 50 and 52 are rotated simultaneously at the desired rate of speed, to disintegrate the vegetation entering the open throat formed between side plates 12 so that all vegetable matter being contacted with respective teeth of the respective cylinders is disintegrated into relatively small bits.

The hydraulic system, shown diagrammatically in FIG. 3, has a power actuated pump 86 which withdraws hydraulic fluid from reservoir 88 through conduit 90 to direct the hydraulic fluid outward under pressure through conduit 92, and after passage through conduit 92 into passages in valves, generally designated by 26, and if the valves designated at 26 are closed, the hydraulic fluid will be by-passed through conduit 94 and pressure relief valve 96 into return conduit 98 to discharge into reservoir 88. However, passages within the valves, which are generally designated at 26, are common to the respective conduits 92 and 98, and upon operation of the valves designated at 26 and comprising valves 101, 102 and 104, by manipulation of the respective levers of valves 101, 102 and 104, thereby the respective hydraulic cylinders 28, 34 and 24 are operated by the hydraulic fluid directed thereinto.

The respective hydraulic cylinders are of the double acting type and the representive valves 101, 102, and 104 are connected thereto by the respective pairs of conduits 106 and 108; 110, and 112; and 114 and 116, which valves are so arranged that movement of the respective levers thereof in one direction will direct hydraulic fluid into one end of the respective cylinders, and by movement of the levers of the respective valves in the opposite direction, as indicated in dashed outline, will direct hydraulic fluid into the opposite end of hydraulic cylinders and direct the expelled fluid outward from the opposite end of the respective cylinders into discharge conduit 98, and thence into reservoir 88.

It will be seen that, by manipulation of the lever of valve 101, the hydraulic cylinder 28 may be actuated to vary the angularity of the tongue 4 with respect to the upright support member 30 on the frame 11 of the machine 1. In this manner the front of frame 11 and the machine 1 may be raised or lowered relative to the terrain over which the tractor 2 operates, and by manipulation of the lever of valve 102, hydraulic fluid may be directed into one end of each of the cylinders 34 with the expelled fluid being directed outward therefrom through valve 102 into discharge line 98 which leads to reservoir 88, so as to vary the relative position of blade 38 with respect to the lower sides of side plates 12, and since the side plates 12, and other elements of the machine 1 are made of heavy material, and the machine has a power drive unit 3 mounted thereon, the blade 38 may be held in a fixed relative position with respect to the surface of the terrain over which the machine 1 is moved. However, the blade 38 may be readily raised, when desired, or it may be removed bodily from the machine, as shown in FIG. 10, so that the wedge shaped teeth 54 and the teeth 55 will come into close proximity to the surface of the terrain so the rotating cylinders on which the teeth are fixed, may be used to disintegrate the vegetable matter, and foreign matter, such as rocks which pass into the machine.

A further pair of hydraulic cylinders 24 is mounted on the rear portion of frame 11 of machine 1, the movement of the connecting rods of which cylinders raises and lowers the rear portion of the machine, and the wheels may be raised above the ground, if desired, so the machine will be sustained on lower edges of the side plates 12, or the hydraulic cylinders 24 may be used to move the wheels downward relative to the curved plate 20 to elevate the machine well above the ground to enable the machine to be moved over roads, or from one place of use to another.

It is to be pointed out that the wheels 14 are pneumatically tired with tires such as used for traction elements, yet they can be used on roads, streets or the like without damage thereto, which makes the unit more versatile for use and for transportation.

Having thus clearly illustrated and described the invention what is claimed as new and desired to be secured by Letters Patent is:

1. A machine for movement over the terrain to clear, disintegrate, and masticate growing vegetation such as brush, trees, and the like, which machine comprises:
   (a) a pair of spaced apart, upright, substantially parallel side plates,
   (b) a cover plate extending between and being connected to said substantially parallel side plates at the respective upper edges thereof,
   (c) a transverse, inwardly facing concave, arcuate, metal plate extending between said substantially parallel side plates near adjacent ends thereof and being secured thereto and to said cover plate to form a housing, which housing has an open lower side and an open throat, which open throat is opposite said transverse, inwardly facing concave, arcuate, metal plate,
      (1) said transverse, inwardly facing concave, arcuate metal plate having spaced apart holes formed therein on the lower side thereof,
      (2) a row of spaced apart, inwardly extending teeth secured to said transverse, inwardly facing concave, arcuate metal plate and lying in a plane at a higher elevation than the holes in said transverse, inwardly facing concave arcuate metal plate,
   (d) wheel support members secured to said housing near each end of said transverse, inwardly facing concave, arcuate, metal plate,
   (e) housing support wheels mounted on said wheel support members to engage the terrain,
   (f) means adjustably interconnecting said wheel support members and said housing to move said wheels relative to the end of said housing mounting said transverse, inwardly facing concave, arcuate, metal plate,
   (g) power means operably connected with said housing to move said housing over the terrain on said support wheels with the open throat of said housing facing in the line of movement thereof,
   (h) a first rotatable member rotatably mounted in said housing transversely thereof and of the line of movement of said housing,
      (1) a plurality of edged cutter teeth secured to said first rotatable member at spaced apart intervals along the length thereof and extending outwardly therefrom, which cutter teeth are circumferentially spaced around said first rotatable member,
      (2) a bar secured to the cover plate of said housing and extending downwardly to be in close proximity to the distal end of each said cutter tooth as said rotatable member rotates,
   (i) a second rotatable member rotatably mounted in said housing and being parallel to said first rotatable member, and being spaced therefrom,
      (1) a plurality of edged cutter teeth secured to said second rotatable member at spaced apart intervals along the length thereof and extending outwardly therefrom, which cutter teeth are circumferentially spaced around said second rotatable member,
      (2) a plurality of abutments secured to the cover plate of said housing and extending downwardly therefrom between certain of said teeth when said rotatable member carrying said teeth is rotated,
      (3) the axis of said second rotatable member lying in a lower horizontal plane than the axis of said first rotatable member,
   (j) a third rotatable member rotatably mounted in said housing and being parallel to said first rotatable member, and being spaced therefrom and from said second rotatable member,
      (1) a plurality of teeth secured to said third rotatable member at spaced apart intervals along the length thereof and extending outwardly therefrom, which cutter teeth are circumferentially spaced around said third rotatable member,
      (2) a plurality of spaced apart, angularly positioned stationary bars secured to said transverse, inwardly facing concave, arcuate, metal plate along the length thereof, which stationary bars lie in planes passing transversely through the axis of said third rotatable member and being in position to extend between said teeth on said third rotatable member, when said third rotatable member carrying said teeth is rotated, and
(k) means connected in driving relation to said rotatable members to rotate all said members simultaneously in the same direction.

2. A machine for movement over the terrain to clear, disintegrate, and masticate growing vegetation such as brush, trees and the like, as defined in claim 1; wherein
(a) the paths as defined by the ends of the teeth of the respective rotatable members is circular in pattern when the respective rotatable members are rotated,
(b) one of said transversely disposed rotatable members lies in a vertical plane which passes transversely through said housing and being intermediate said first and third rotatable members, and
(c) the ends of some of said teeth defining circular patterns lie in a plane extending between the bottoms of said pair of spaced apart, upright, substantially parallel side plates when said second rotatable member is rotated.

3. A machine for movement over the terrain to clear, disintegrate, and masticate growing vegetation such as brush, trees, and the like as defined in claim 1; wherein
(a) said transversely, inwardly facing concave, arcuate, metal plate being parti-cylindrical in form with the axis thereof being coaxial with said third rotatable member,
(b) said parti-cylindrical metal plate being more than 180 degrees in circumference,
(c) the ends of said teeth of said third rotatable member which rotate within said parti-cylindrical metal plate pass in close proximity to the inner surface of said parti-cylindrical metal plate and are evenly spaced therefrom, which teeth have more than 180 degrees of rotation within said parti-cylindrical metal plate upon rotation of said third rotatable member,
(d) said angularly positioned stationary bars secured to said transverse, inwardly facing concave, arcuate metal plate are chordal between the transverse extremities of the parti-cylindrical metal plate for the dual purpose of bracing the extremities of said parti-cylindrical metal plate and to form abutments for disintegrating the material passes therethrough.

4. A machine for movement over the terrain to clear, disintegrate, and masticate growing vegetation such as brush, trees and the like, as defined in claim 3, wherein
(a) a transverse, perforate plate positioned between said side plates with the lower edge thereof lying in a plane extending between the lower edges of said side plates and being immediately adjacent the peripheral path defined by the ends of the teeth of said second rotatable member,
(b) the other edge of said transverse perforate plate being in abutting relation with the lower edge of said parti-cylindrical metal plate to direct material from said second rotatable member to said third rotatable member.

5. A machine for movement over the terrain to clear, disintegrate, and masticate growing vegetation, such as brush, trees and the like, which machine comprises:
(a) a pair of spaced apart, upright, substantially parallel side plates,
(b) a cover plate extending between said being connected to said substantially parallel side plates at the respective upper edges thereof,
(c) a transverse, parti-cylindrical metal plate extending between said parallel side plates to form a housing which housing has an open lower side and an open throat, which open throat is opposite said transverse, parti-cylindrical metal plate,
(1) said parti-cylindrical, metal plate having the concave open side thereof facing toward said open throat,
(2) said parti-cylindrical metal plate having spaced apart holes formed therein near the lower side thereof,
(3) a row of spaced apart, inwardly extending teeth secured to said transverse, parti-cylindrical metal plate and extending toward the axis thereof and being located in a plane at a higher elevation than said holes,
(d) wheeled support members secured to said housing near each end of said parti-cylindrical metal plate,
(e) housing support wheels mounted on said wheel support members to engage the terrain,
(f) means adjustably interconnecting said wheel support members and said housing to move said wheels relative to the end of said housing mounting said transverse, parti-cylindrical metal plate,
(g) a first power means operably connected with said housing to move said housing over the terrain on said support wheels, with the open throat of said housing facing the line of movement thereof,
(h) a first rotatable member rotatably mounted in said housing transversely thereof and of the line of movement of said housing,
(1) a plurality of edged cutter teeth secured to said first rotatable member at spaced apart intervals along the length thereof and extending outwardly therefrom, which cutter teeth are circumferentially spaced around said first rotatable member,
(2) a bar secured to the cover plate of said housing and extending downwardly to be in close proximity to the distal end of each said cutter tooth as said first rotatable member rotates,
(i) a second rotatable member rotatably mounted in said housing and being parallel to said first rotatable member and being spaced therefrom,
(1) a plurality of edged cutter teeth secured to said second rotatable member at spaced apart intervals along the length thereof and extending outwardly therefrom, which cutter teeth are circumferentially spaced around said second rotatable member,
(2) a plurality of abutments secured to the cover plate of said housing and extending downwardly therefrom between certain of said teeth when said rotatable member carrying said teeth is rotated.
(3) the axis of said second rotatable member lying in a lower horizontal plane than the axis of said first rotatable member,
(j) a third rotatable member rotatably mounted in said housing and being coaxial with said parti-cylindrical metal plate and being parallel to said first rotatable member and being spaced therefrom and from said second rotatable member,
(1) a plurality of teeth secured to said third rotatable member at spaced apart intervals along the length thereof and extending outwardly therefrom, which cutter teeth are circumferentially spaced around said third rotatable member,
(2) a plurality of spaced apart, angularly positioned, stationary bars secured to said transverse, parti-cylindrical metal plate along the length thereof, which stationary bar lie in a plane passing transversely through the axis of said third rotatable member and being in position to extend between said teeth on said third rotatable member, when said third rotatable member, carrying said teeth, is rotated,
(k) a second power means,
(1) said second power means being mounted on said housing for operation independently of said first power means,
(l) power transmisison drive means connecting said second power means with said first, second and third rotatable members for driving said rotatable members simultaneously in the same direction of rotation, and (m) means for independently varying the elevation of each end of said housing relative to the surface of the terrain over which said machine operates.

References Cited in the file of this patent
UNITED STATES PATENTS

| | | |
|---|---|---|
| 395,869 | Bearly | Jan. 8, 1889 |
| 674,425 | Nilson | May 21, 1901 |
| 1,648,341 | Goble | Nov. 8, 1927 |
| 1,781,904 | Jamison | Nov. 18, 1930 |
| 1,894,516 | Karstedt | Jan. 17, 1933 |
| 2,491,739 | La Dow | Dec. 20, 1949 |
| 2,539,136 | Hite | Jan. 23, 1951 |
| 2,541,853 | Armington et al. | Feb. 13, 1951 |
| 2,830,519 | Chandler et al. | Apr. 15, 1958 |
| 2,986,841 | MacDonald | June 6, 1961 |